United States Patent
Holmes et al.

(10) Patent No.: US 9,387,534 B2
(45) Date of Patent: Jul. 12, 2016

(54) CONTROL ARM AND A METHOD FOR FORMING THE SAME

(71) Applicant: ZF Friedrichshafen AG, Friedrichshafen (DE)

(72) Inventors: Eric Holmes, Ann Arbor, MI (US); Harold Hopkinson, Farmington Hills, MI (US); Barbara Jones, Davison, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/473,093

(22) Filed: Aug. 29, 2014

(65) Prior Publication Data

US 2016/0059651 A1    Mar. 3, 2016

(51) Int. Cl.
| | |
|---|---|
| B22D 29/00 | (2006.01) |
| B22D 19/00 | (2006.01) |
| B22D 19/16 | (2006.01) |
| B60G 3/20 | (2006.01) |
| B60G 11/18 | (2006.01) |
| B22D 19/04 | (2006.01) |

(52) U.S. Cl.
CPC ............... *B22D 29/00* (2013.01); *B22D 19/00* (2013.01); *B22D 19/04* (2013.01); *B22D 19/16* (2013.01); *B60G 3/20* (2013.01); *B60G 11/181* (2013.01); *B60G 2200/144* (2013.01); *B60G 2202/132* (2013.01); *B60G 2206/10* (2013.01); *B60G 2206/8101* (2013.01)

(58) Field of Classification Search
CPC ........ B22D 19/00; B22D 19/16; B22D 29/00; B60G 3/06; B60G 11/181; B60G 11/183; B60G 11/20; B60G 2200/144; B60G 2202/132; B60G 2206/10; B60G 2206/8101; B60G 2206/81012
See application file for complete search history.

(56) References Cited

U.S. PATENT DOCUMENTS

| | | | | |
|---|---|---|---|---|
| 3,027,177 | A * | 3/1962 | Karlstad, Jr. | B60G 17/025 267/222 |
| 3,659,323 | A * | 5/1972 | Hachisu | B22D 19/16 164/76.1 |
| 4,570,969 | A * | 2/1986 | Tsutsumi | B60G 3/26 280/124.104 |
| 4,808,486 | A * | 2/1989 | Yamamoto | B22D 19/06 428/609 |
| 5,005,859 | A * | 4/1991 | Satoh | B60G 11/183 188/130 |
| 5,478,103 | A * | 12/1995 | Maeda | B60G 7/001 267/273 |
| 5,516,130 | A | 5/1996 | Mitchell | |
| 5,657,811 | A * | 8/1997 | Cook | B22D 19/14 164/97 |
| 5,687,960 | A * | 11/1997 | Moon | B60G 11/181 267/154 |
| 5,976,709 | A * | 11/1999 | Kageyama | B22D 19/00 164/98 |
| 6,070,892 | A * | 6/2000 | Noutomi | B60G 7/02 267/274 |
| 6,079,294 | A * | 6/2000 | Mizobe | B21J 5/00 74/594.1 |

(Continued)

*Primary Examiner* — Barry Gooden, Jr.
(74) *Attorney, Agent, or Firm* — Dority & Manning, P.A.

(57) ABSTRACT

A method for forming a control arm is provided. The method includes providing an insert and a mold and also includes overcasting the insert within a metal in the mold. The insert defines a recess that is shaped for receiving a mating component. After the insert is overcast within the metal, the mating component may be positioned or mounted within the recess of the insert. A related control arm is also provided.

20 Claims, 6 Drawing Sheets

(56) References Cited

U.S. PATENT DOCUMENTS

| | | | | |
|---|---|---|---|---|
| 6,099,006 A * | 8/2000 | Sugiyama | | B60G 11/20 280/124.149 |
| 6,195,894 B1 * | 3/2001 | Mizobe | | B21J 5/00 164/132 |
| 6,364,297 B1 | 4/2002 | Weber | | |
| 6,450,237 B1 * | 9/2002 | Meyer | | B22D 19/16 164/119 |
| 6,454,284 B1 * | 9/2002 | Worman, Jr. | | B60G 11/20 280/124.101 |
| 6,779,806 B1 * | 8/2004 | Breitbach | | B60G 11/20 280/124.106 |
| 7,429,054 B1 | 9/2008 | Turner | | |
| 7,494,143 B2 | 2/2009 | Verbowski | | |
| 8,496,258 B2 * | 7/2013 | Werner | | B22D 19/00 280/124.166 |
| 9,073,403 B2 * | 7/2015 | Werner | | B22D 19/00 |
| 2002/0063408 A1 * | 5/2002 | Klais | | B60G 7/02 280/124.134 |
| 2002/0166448 A1 * | 11/2002 | Bedwell | | B22D 15/02 92/222 |
| 2002/0190493 A1 | 12/2002 | Schnurpel | | |
| 2003/0019604 A1 * | 1/2003 | Ishiduka | | B22D 17/00 164/98 |
| 2004/0009072 A1 * | 1/2004 | Baur | | B22D 17/2069 416/244 A |
| 2004/0100051 A1 * | 5/2004 | Klais | | B60G 11/181 280/86.754 |
| 2007/0151698 A1 * | 7/2007 | Yu | | B22C 9/064 164/137 |
| 2007/0271793 A1 * | 11/2007 | Mellis | | B22D 17/007 29/897.2 |
| 2008/0265626 A1 * | 10/2008 | Dorr | | B62D 21/11 296/204 |
| 2009/0066049 A1 * | 3/2009 | Kunert | | B60G 3/265 280/124.134 |
| 2010/0117325 A1 * | 5/2010 | Lee | | B60G 13/003 280/124.155 |
| 2010/0253030 A1 * | 10/2010 | D'Aponte | | B60G 3/22 280/124.116 |
| 2011/0068619 A1 * | 3/2011 | Werner | | B22D 19/00 301/127 |
| 2011/0221153 A1 * | 9/2011 | Bladt | | B29C 45/1676 280/124.106 |
| 2011/0268922 A1 * | 11/2011 | Matsumoto | | B22D 17/007 428/156 |
| 2012/0037466 A1 * | 2/2012 | Lee | | B22D 19/00 188/218 R |
| 2012/0090802 A1 * | 4/2012 | Simon | | B22D 19/00 164/6 |
| 2013/0009390 A1 * | 1/2013 | Charest | | B22D 19/00 280/785 |
| 2014/0345353 A1 * | 11/2014 | Oda | | B22D 13/02 72/252.5 |
| 2014/0377587 A1 * | 12/2014 | Oda | | B21B 27/032 428/682 |
| 2015/0056470 A1 * | 2/2015 | Aoyama | | B22D 19/04 428/684 |
| 2015/0266338 A1 * | 9/2015 | Kim | | B22D 18/04 301/63.107 |

\* cited by examiner

CONTROL ARM AND A METHOD FOR FORMING THE SAME

FIELD OF THE INVENTION

The present subject matter relates generally to control arms for vehicles, such as light trucks or ATVs.

BACKGROUND OF THE INVENTION

Vehicles, such as light trucks and all-terrain vehicles (ATVs), commonly include a torsion bar suspension. Torsion bar suspensions generally include a torsion bar and a control arm. The control arm is rotatably mounted to a frame of the vehicle at one end of the control arm. At an opposite end of the control arm, a wheel hub or spindle is coupled to the control arm. The torsion bar is fixed to the frame at one end of the torsion bar and is fixed to the control arm at an opposite end of the torsion bar. The torsion bar supports the vehicle and maintains the vehicle's ride height by opposing rotation of the control arm in one direction.

The torsion bar may be mounted to the control arm in various manners. For example, certain control arms include a socket defined in the control arm. The socket is generally formed by broaching and/or milling the shape of the socket after casting the control arm. Broaching, milling and other machining processes can be expensive and time consuming operations. Thus, forming the socket on the control arm with such processes can increase the cost and production time of the control arm. In addition, broaching require certain clearances in order to suitably machine the socket. Thus, the location and orientation of socket on the control arm is generally constrained by limitations of the broaching process. Similar problems are encountered forming other mating features of the control arm, such as the ball joint housing of the control arm and the bushing holder of the control arm.

Accordingly, a control arm that includes features for easily and/or cheaply forming a mounting feature of the control arm would be useful. In particular, a control arm that includes features for easily and/or cheaply forming a recess for receiving a torsion bar would be useful. In addition, a method for quickly and cheaply forming a control arm with a recess for receiving a mating feature of a vehicle suspension would be useful.

BRIEF DESCRIPTION OF THE INVENTION

The present subject matter provides a method for forming a control arm. The method includes providing an insert and a mold and also includes overcasting the insert within a metal in the mold. The insert defines a recess that is shaped for receiving a mating component. After the insert is overcast within the metal, the mating component may be positioned or mounted within the recess of the insert. A related control arm is also provided. Additional aspects and advantages of the invention will be set forth in part in the following description, or may be apparent from the description, or may be learned through practice of the invention.

In a first exemplary embodiment, a method for forming a vehicle control arm is provided. The method includes positioning an insert within a mold. The mold defines a void that corresponds to a shape of the vehicle control arm. The insert defines a recess for receiving a mating component of a vehicle suspension. The method also includes casting a metal over the insert within the mold in order to form the vehicle control arm with the metal and the insert, and removing the vehicle control arm from the mold after the step of casting or otherwise forming the desired shape of the casting.

In a second exemplary embodiment, a control arm for a vehicle is provided. The control arm includes an arm that extends between a first end portion and a second end portion. A bushing support is portioned at the first end portion of the arm. A ball joint support is positioned at the second end portion of the arm. An insert is overcast within the arm such that at least a portion of the insert is disposed within the arm. The insert defines a recess for receiving a torsion bar.

In a third exemplary embodiment, a method for forming a vehicle control arm is provided. The method includes providing an insert and a mold. The insert defines a recess that is shaped for receiving a mating component. The mold defines a void. The void of the mold conforms to a shape of the vehicle control arm. The method also includes overcasting the insert within a metal in the mold and removing the vehicle control arm from the mold after the step of overcasting.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
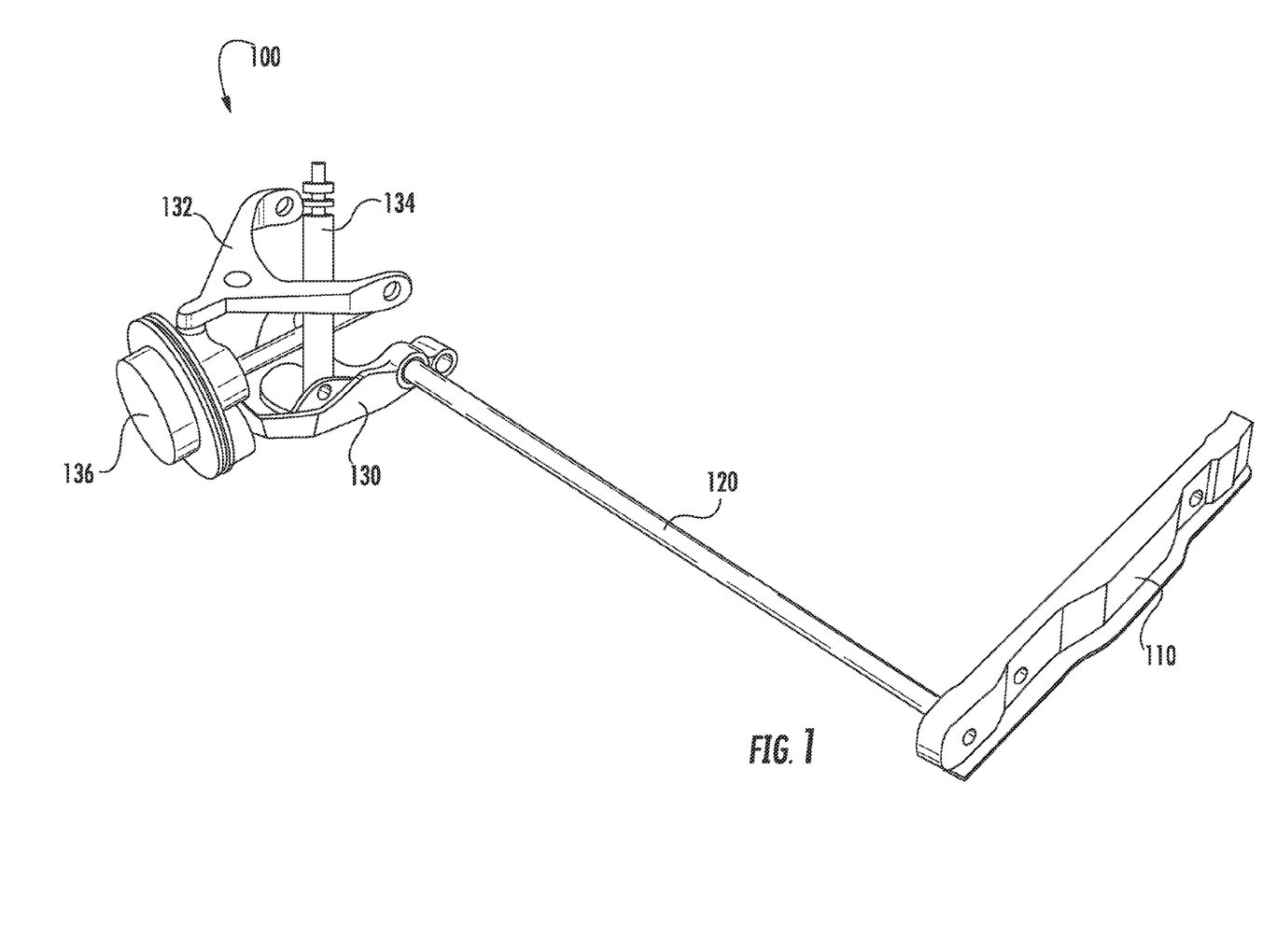
FIG. 1 provides a schematic view of a torsion bar suspension assembly according to an exemplary embodiment of the present subject matter.

FIG. 1 provides a schematic view of a torsion bar suspension assembly 100 according to an exemplary embodiment of the present subject matter. Torsion bar suspension assembly 100 may be configured for supporting or suspending a wheel in any suitable vehicle. For example, torsion bar suspension assembly 100 may be used to support or suspend a wheel of a light truck, a car, an all-terrain vehicle (ATV), etc. Torsion bar suspension assembly 100 is configured for allowing or permitting vertical movement of an associated tire or wheel in order to assist with maintaining support of the vehicle while keeping contact between the tire or wheel and the ground, as will be understood by those skilled in the art. Torsion bar suspension assembly 100 is discussed in greater detail below.

As may be seen in FIG. 1, torsion bar suspension assembly 100 includes a torsion bar 120, a bottom or lower control arm 130, a top or upper control arm 132, a damper or shock absorber 134 and a steering knuckle or hub 136. As will be understood by those skilled in the art, lower control arm 130 and upper control arm 132 may be rotatably or pivotally mounted to a chassis or frame 110 of an associated vehicle. Thus, lower control arm 130 and upper control arm 132 may rotate or pivot relative to frame 110.

Lower and upper control arms 130, 132 may have any suitable shape. For example, in the exemplary embodiment shown in FIG. 1, lower and upper control arms 130, 132 are A-shaped wishbone control arms. In alternative exemplary embodiments, lower and upper control arms 130, 132 may be L-shaped, U-shaped, etc. Upper control arm 132 may also be shorter than lower control arm 130 in order to provide or induce negative camber during vertical motion of hub 136.

Torsion bar 120 extends between frame 110 and lower control arm 130. Respective ends of torsion bar 120 are fixed to frame 110 and lower control arm 130. Thus, torsion bar 120 couples lower control arm 130 to frame 110. Torsion bar 120 hinders or opposes rotation of lower control arm 130, e.g., in one direction. For example, vertical motion of a wheel or tire mounted on hub 136 causes lower control arm 130 to rotate or pivot, and torsion bar 120 twists or elastically deforms during such motion of lower control arm 130. Torsion bar 120 may also assist with returning lower control arm 130 and hub 136 to a desired ride height. In such a manner, torsion bar 120 may assist with opposing or hindering rotation of lower control arm 130 in order to suspend and support hub 136 at the desired ride height. Shock absorber 134 is connected or mounted to lower control arm 130 and may also assist with opposing or hindering rotation of lower control arm 130 in order to suspend and support hub 136 at the desired ride height, as will be understood by those skilled in the art.

Figure 2:
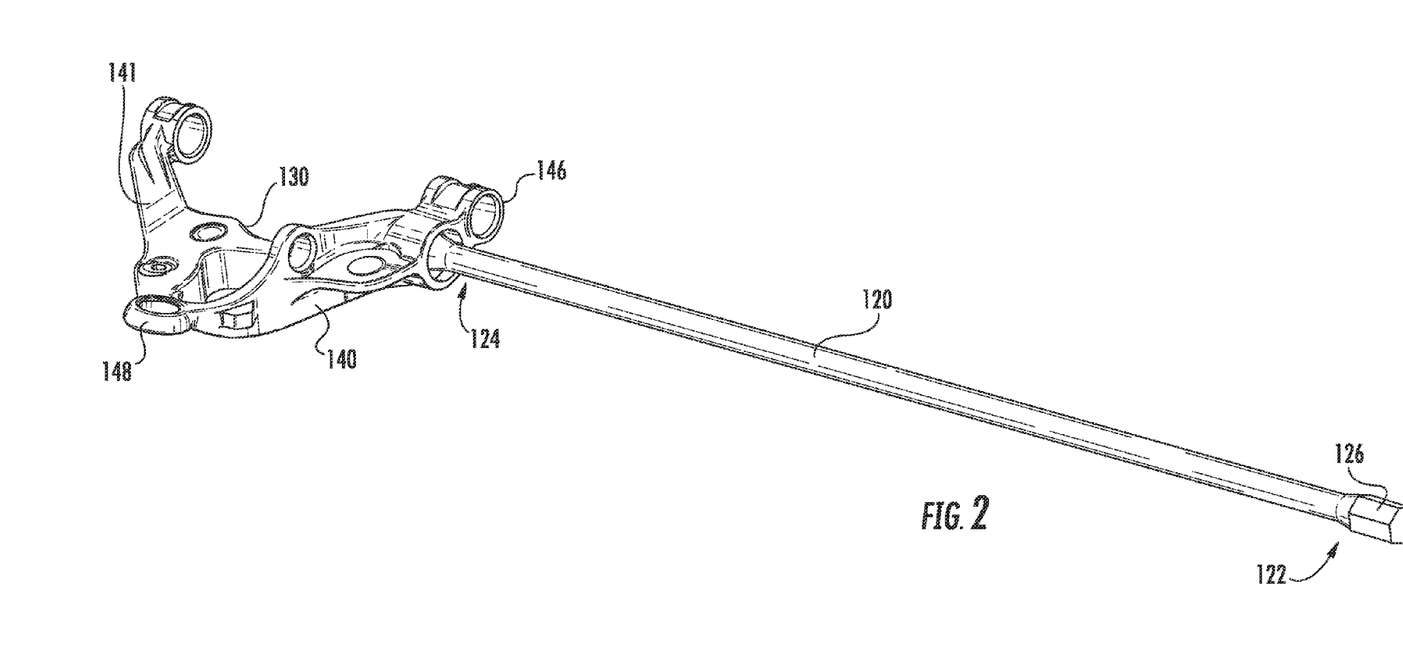
FIG. 2 provides a perspective view of a lower control arm and a torsion bar of the exemplary torsion bar suspension assembly of FIG. 1.
Figure 3:
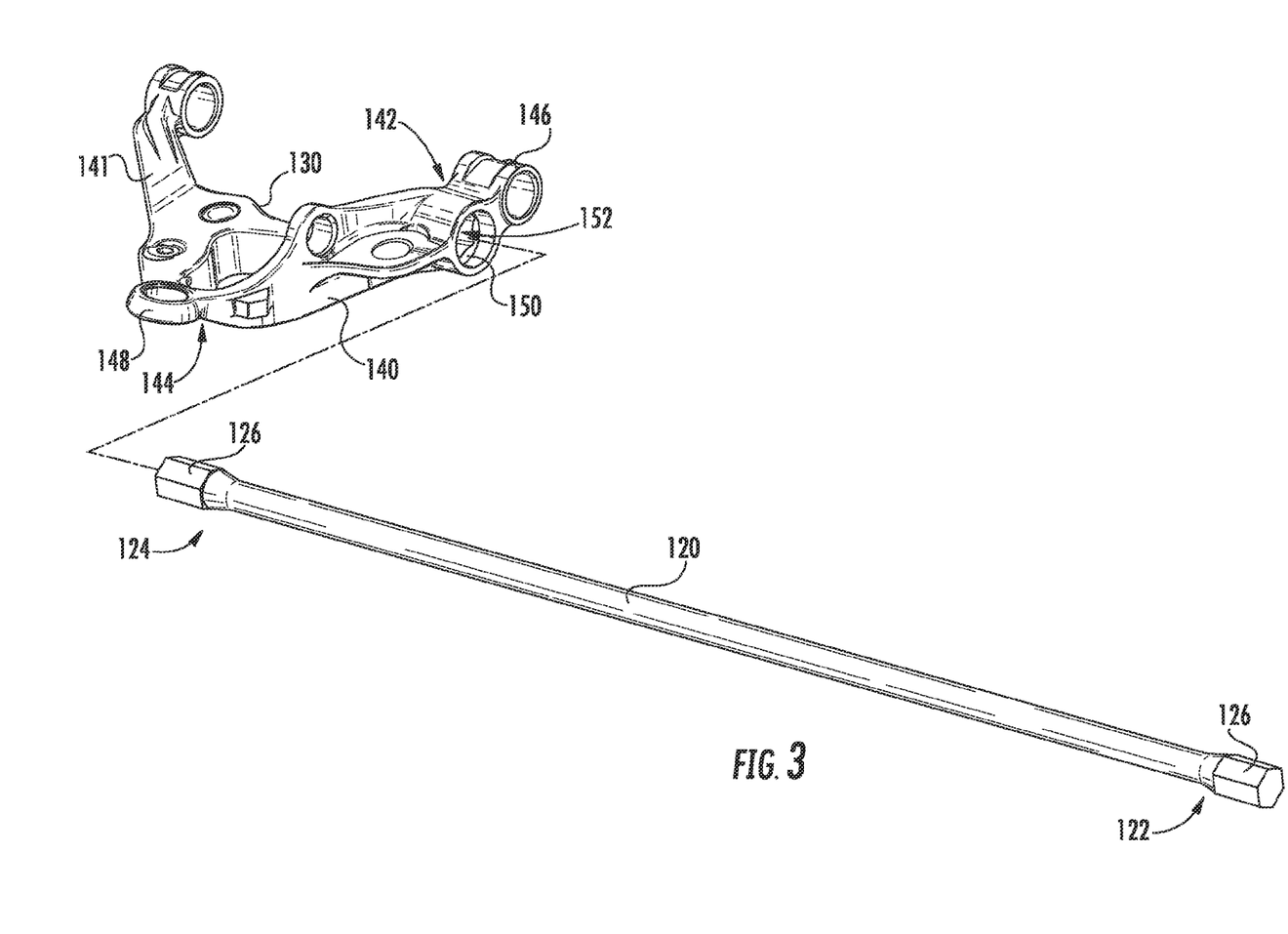
FIG. 3 provides an exploded view of the lower control arm and the torsion bar of FIG. 2.

FIG. 2 provides a perspective view of lower control arm 130 and torsion bar 120 of torsion bar suspension assembly 100. FIG. 3 provides an exploded view of lower control arm 130 and torsion bar 120. As may be seen in FIGS. 2 and 3, torsion bar 120 extends, e.g., rectilinearly, between a first end portion 122 and a second end portion 124. First end portion 122 of torsion bar 120 may be positioned at and secured to frame 110 (FIG. 1). Second end portion 124 of torsion bar 120 is positioned at and secured to lower control arm 130.

Torsion bar 120 defines or forms substantially hexagonal shaped couplings 126 that assist with coupling or fixing torsion bar 120 to frame 110 and lower control arm 130. In particular, substantially hexagonal shaped coupling 126 at first end portion 122 of torsion bar 120 may be received within an anchor or key on frame 110, and substantially hexagonal shaped coupling 126 at second end portion 124 of torsion bar 120 may be received within a component of lower control arm 130, as discussed in greater detail below. It should be understood that couplings 126 may have any other suitable shape, in alternative exemplary embodiments. As discussed in greater detail below, lower torsion bar 120 includes features for assisting with forming the connection or coupling between torsion bar 120 and lower control arm 130, e.g., cheaply and/or simply.

Figure 4:
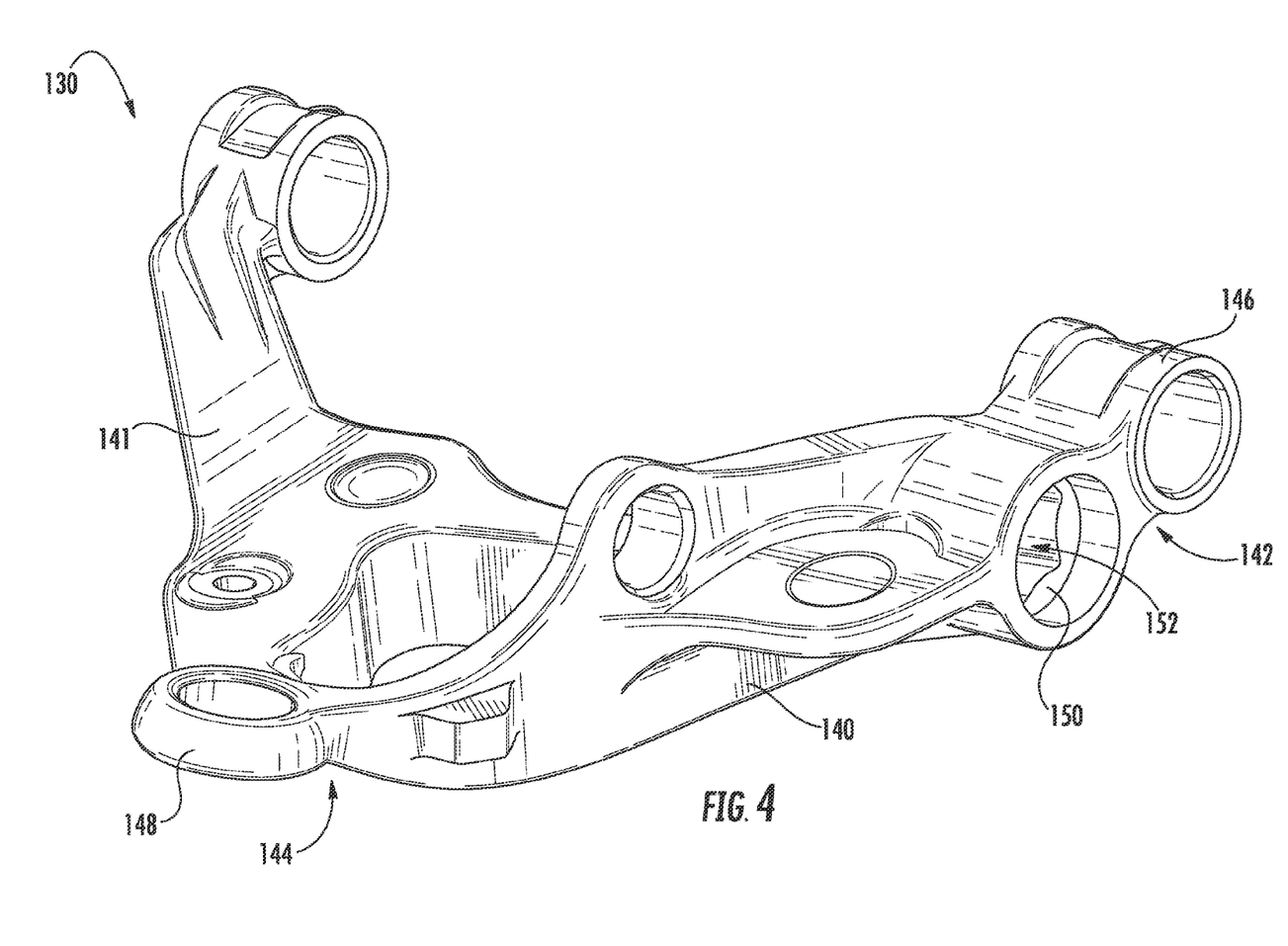
FIG. 4 provides a perspective view of the lower control arm of the exemplary torsion bar suspension assembly of FIG. 1.

FIG. 4 provides a perspective view of lower control arm 130. As may be seen in FIG. 4, lower control arm 130 includes a first or primary arm 140 and a second or secondary arm 141. Primary arm 140 and secondary arm 141 are coupled and connected to each other, e.g., in order to form the wishbone shape of lower control arm 130. Primary arm 140 extends between a first end portion 142 and a second end portion 144. It should be understood that lower control arm 130 need not include secondary arm 141, in alternative exemplary embodiments.

Lower control arm 130 also includes (e.g., defines) a bushing bracket or support 146 and a ball joint bracket support 148. Primary arm 140, bushing support 146 and ball joint support 148 may all be formed of cast metal of lower control arm 130. Thus, cast metal of lower control arm 130 may define each of primary arm 140, bushing support 146 and ball joint support 148 such that primary arm 140, bushing support 146 and ball joint support 148 are formed of or with a single continuous or integral piece of cast metal.

Bushing support 146 is positioned at or adjacent first end portion 142 of primary arm 140. Bushing support 146 is sized and oriented for receiving and supporting a bushing (not shown) therein. Bushing support 146 may support the bushing therein in order to assist with rotatably mounting lower control arm 130 to frame 110 (FIG. 1). Thus, a mounting pivot or point of frame 110 may be received within bushing support 146 in order to assist with mounting lower control arm 130 to frame 110. The bushing within bushing support 146 may assist with constraining lower control arm 130 to frame 110 while facilitating rotation or pivoting of lower control arm 130 relative to frame 110.

Ball joint bracket or support 148 is positioned at or adjacent second end portion 144 of primary arm 140. Ball joint bracket support 148 is sized and oriented for receiving and supporting a ball joint (not shown). Ball joint bracket support 148 may support the ball joint in order to assist with compliantly or pivotally mounting lower control arm 130 to hub 136 (FIG. 1). Thus, the ball joint may extend between and couple lower control arm 130 to hub 136 at ball joint bracket support 148.

Figure 5:
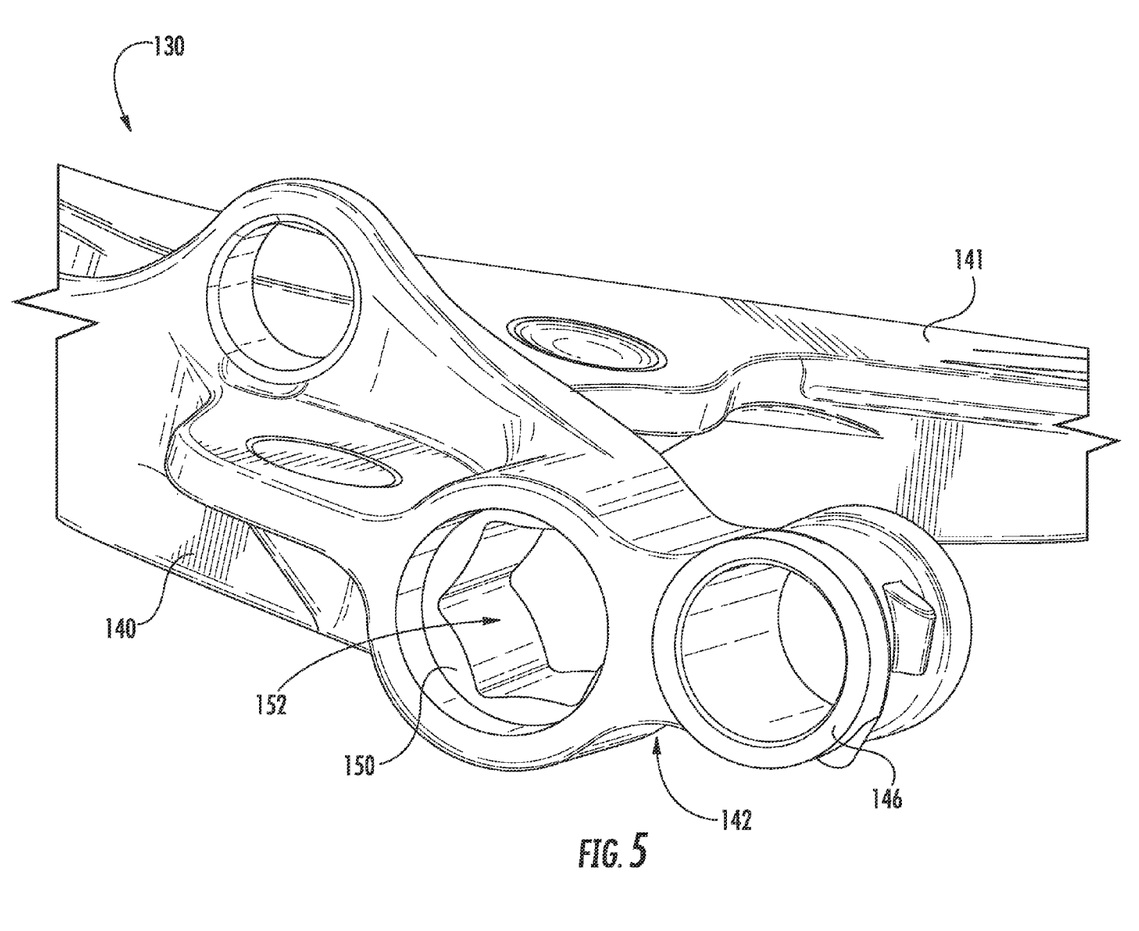
FIG. 5 partial perspective view of the lower control arm of the exemplary torsion bar suspension assembly of FIG. 1.

FIG. 5 partial perspective view of lower control arm 130 of torsion bar suspension assembly 100. As may be seen in FIG. 5, lower control arm 130 includes an insert 150. Insert 150 defines a recess 152 that is positioned and shaped for receiving and engaging torsion bar 120. For example, insert 150 may be a hexagonal recess in order to receive and engage substantially hexagonal shaped coupling 126 at second end portion 124 of torsion bar 120 (FIG. 3). Thus, insert 150 may couple torsion bar 120 to lower control arm 130. In particular, recess 152 may be shaped for transmitting torsion between lower control arm 130 and torsion bar 120. Insert 150 may be positioned adjacent or proximate first end portion 142 of primary arm 140. In particular, insert 150 may be positioned between bushing support 146 and ball joint support 148 on primary arm 140 of lower control arm 130.

Figure 6:
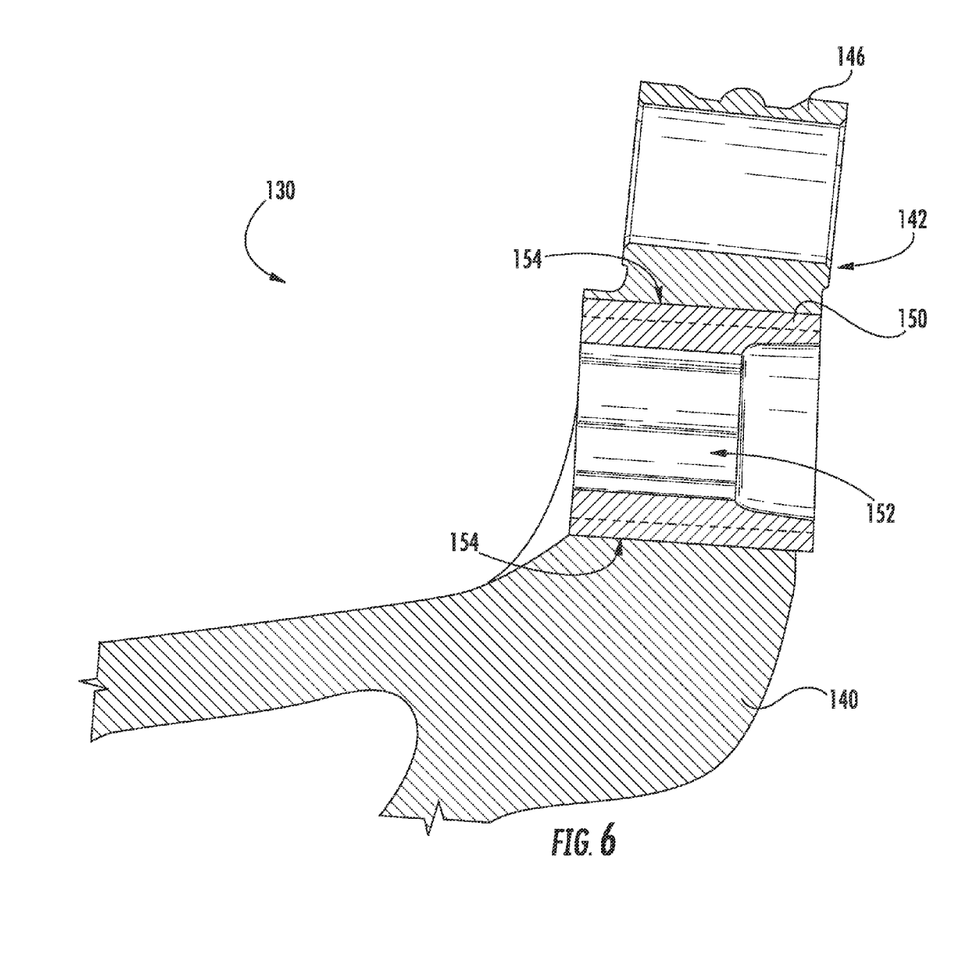
FIG. 6 provides a partial, section view of the lower control arm of the exemplary torsion bar suspension assembly of FIG. 1.

FIG. 6 provides a partial, section view of lower control arm 130 of torsion bar suspension assembly 100. As may be seen in FIG. 6, insert 150 is overcast within primary arm 140, e.g., such that at least a portion of insert 150 is disposed within the cast metal of primary arm 140. Thus, insert 150 may be partially encased within the cast metal of primary arm 140 in order to mount insert 150 within primary arm 140. Formation of lower control arm 130 with insert 150 at least partially disposed within primary arm 140 is discussed in greater detail below.

Primary arm 140 and insert 150 may each be constructed of or with any suitable material. For example, insert 150 may be constructed of or with a metal, such as iron, steel or aluminum. Similarly, primary arm 140 may be constructed of or with a metal, such as iron, steel or aluminum. In certain exemplary embodiments, insert 150 may be constructed of a first material, and primary arm 140 may be constructed with a second material. The first and second materials may be common materials or may be different. Thus, as an example, insert 150 may be constructed of or with steel, and primary arm 140 may be constructed of or with cast iron. As another example, insert 150 may be constructed of or with iron, and primary arm 140 may also be constructed of or with iron. As may be seen in FIG. 6, primary arm 140 and insert 150 define an junction or interface 154 between the first material of insert 150 and the second material of primary arm 140.

Insert 150 may have any suitable shape. For example, insert 150 may have an anti-rotational or rotation inhibiting shape. In particular, insert 150 may have fins, ribs, projections or other features that extend into the cast metal of primary arm 140 in order to inhibit rotation of insert 150 within primary arm 140. As another example, insert 150 may have an oval outer surface, a polygonal outer surface, etc. in order to hinder rotation of insert 150 within primary arm 140.

An exemplary method for forming bottom control arm 130 is described in greater detail below. It should be understood that the exemplary method described below may be used to form any suitable control arm, such as upper control arm 132, in alternative exemplary embodiments. In addition, it should also be understood that, while described in the context of forming recess 152 for receiving torsion bar 120, the exemplary method described below may be used to form any suitable mating connection of lower control arm 130. For example, the exemplary method described below may be used to form bushing support 146, ball support joint 148, etc., or combinations thereof with an insert or inserts. Thus, the exemplary method described below is not limited to forming the mating connection between lower control arm 130 and torsion bar 120 with insert 150.

As a first step, insert 150 with recess 152 is constructed or provided. Insert 150 with recess 152 may be formed or constructed using any suitable method or mechanism. For example, insert 150 with recess 152 may be shaped and cut from tubing or an extrusion. As another example, insert 150 with recess 152 may be cold formed from a wire or blank. A mold is also formed or provided. The mold defines a void that generally or substantially corresponds to the shape of lower control arm 130. The mold may be formed of any suitable material. For example, the mold may be formed of or with sand or metal, such as steel.

To form lower control arm 130, insert 150 is positioned within the mold. Insert 150 may be positioned within the mold at any suitable time. For example, when the mold is constructed of or with sand, insert 150 may be cast within a sand-core of the mold. As another example, insert 150 may be mounted within the mold after the mold is formed. Thus, insert 150 may be positioned within the mold after the mold is formed or during formation of the mold.

With insert 150 positioned within the mold, a metal, such as iron, aluminum or steel, is cast over insert 150 within the mold in order to form lower control arm 130 with the metal and insert 150. For example, the metal may form or define primary arm 140, secondary arm 141, bushing support 146 and ball joint support 148 of lower control arm 130 with insert 150 is overcast within metal in the mold in order to form lower control arm 130 during the casting. After the casting is complete, lower control arm 130 may be removed from the mold.

It should be understood that lower control arm 130 is a raw casting after being removed from the mold and may require machining to properly size and finish lower control arm 130.

As discussed above, insert 150 defines recess 152. During the casting of lower control arm 130, metal does not fill of recess 152 of insert 150. Thus, recess 152 may be, e.g., substantially or completely, free of metal after casting lower control arm 130. In such a manner, while other components of lower control arm 130 may require machining, recess 152 of insert 150 may not require broaching, milling or other machining after casting lower control arm 130. Thus, insert 150 may provide recess 152 for coupling a mating component of a vehicle suspension to lower control arm 130 while avoiding or reducing costly and time-consuming machining of lower control arm 130 after casting. In addition, recess 152 may be deeper than if formed after casting, and recess 152 may be a blind hex hole as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a vehicle control arm, comprising:
    forming an insert that defines a recess shaped for receiving an end portion of a torsion bar;
    positioning the insert within a mold, the mold defining a void that corresponds to a shape of the vehicle control arm;
    casting a metal over the insert within the mold in order to form a cast arm of the vehicle control arm with the metal and the insert, the insert partially encased within the metal after the metal is cast over the insert within the mold such that the metal does not fill the recess of the insert; and
    removing the vehicle control arm from the mold after said step of casting, the recess positioned for receiving the end portion of the torsion bar between a bushing support and a ball joint support on the vehicle control arm after removing the vehicle control arm from the mold.

2. The method of claim 1, wherein the insert comprises steel and the cast arm comprises iron.

3. The method of claim 1, wherein the insert comprises iron, steel or aluminum and the cast arm also comprises iron, steel or aluminum.

4. The method of claim 1, wherein the mold comprises sand, said step of positioning comprising casting the insert within a sand-core and positioning the sand-core inside the mold.

5. The method of claim 1, further comprising forming the mold, said step of positioning comprising mounting the insert within the mold after said step of forming.

6. The method of claim 1, wherein the recess of the insert is not broached after said step of casting.

7. The method of claim 1, wherein said step of forming comprises cutting the insert from a tubing or an extrusion.

8. The method of claim 1, wherein said step of forming comprises cold forming the insert from a wire or a blank.

9. A control arm for a vehicle, comprising:
an arm extending between a first end portion and a second end portion;
a bushing support positioned at the first end portion of the arm;
a ball joint support positioned at the second end portion of the arm;
an insert overcast within the arm such that at least a portion of the insert is disposed within the arm, the insert defining a recess for receiving a torsion bar, the recess shaped for transmitting torsion between the control arm and torsion bar, the insert positioned adjacent the first end portion of the arm and between the bushing support and the ball joint support on the arm.

10. The control arm of claim 9, wherein the insert is constructed of a first material and the arm is constructed with a second material, the first and second materials being different.

11. The control arm of claim 10, wherein the first material comprises steel and the second material comprises iron.

12. The control arm of claim 9, wherein the insert and the arm are constructed with a common material.

13. The control arm of claim 9, wherein the recess of the insert is a hexagonal recess.

14. The control arm of claim 9, wherein the insert has a plurality of projections that extend into cast metal of the arm such that the projections of the plurality of projections inhibit rotation of the insert relative to the arm.

15. The control arm of claim 9, wherein the insert has an oval outer surface or a polygonal outer surface in order to inhibit rotation of the insert relative to the arm.

16. A method for forming a vehicle control arm, comprising:
forming an insert that defines a recess shaped for receiving an end portion of a torsion bar;
providing a mold, the mold defining a void, the void of the mold conforming to a shape of the vehicle control arm;
overcasting the insert within a metal in the mold, the insert partially encased within the metal after the insert is overcast within the metal in the mold such that the metal does not fill the recess of the insert; and
removing the vehicle control arm from the mold after said step of overcasting, the recess positioned for receiving the end portion of the torsion bar between a bushing support and a ball joint support on the vehicle control arm after removing the vehicle control arm from the mold.

17. The method of claim 16, wherein the insert comprises steel and a cast arm of the vehicle control arm comprises iron.

18. The method of claim 16, further comprising forming the mold and positioning the insert within the mold prior to said step of overcasting.

19. The method of claim 16, wherein said step of forming comprises cutting the insert from a tubing or an extrusion.

20. The method of claim 16, wherein said step of forming comprises cold forming the insert from a wire or a blank.

* * * * *